(12) United States Patent
Tijink et al.

(10) Patent No.: US 11,277,710 B2
(45) Date of Patent: Mar. 15, 2022

(54) SERVICE STATION FOR AN INTELLIGENT TRANSPORTATION SYSTEM

(71) Applicant: Kapsch TrafficCom AG, Vienna (AT)

(72) Inventors: Jasja Tijink, Breitenfurt (AT); Dieter Smely, Schwechat (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 16/990,611

(22) Filed: Aug. 11, 2020

(65) Prior Publication Data

US 2021/0058737 A1 Feb. 25, 2021

(30) Foreign Application Priority Data

Aug. 22, 2019 (EP) ..................... 19192992

(51) Int. Cl.
| | |
|---|---|
| *H04W 4/02* | (2018.01) |
| *H04W 4/44* | (2018.01) |
| *H04W 4/029* | (2018.01) |
| *G08G 1/01* | (2006.01) |
| *G08G 1/052* | (2006.01) |
| *H04W 52/02* | (2009.01) |

(52) U.S. Cl.
CPC .......... *H04W 4/023* (2013.01); *G08G 1/0116* (2013.01); *G08G 1/052* (2013.01); *H04W 4/027* (2013.01); *H04W 4/029* (2018.02); *H04W 4/44* (2018.02); *H04W 52/0229* (2013.01)

(58) Field of Classification Search
None
See application file for complete search history.

(56) References Cited

U.S. PATENT DOCUMENTS

2014/0191884 A1* 7/2014 Maeda ................... G08G 1/163
340/944

FOREIGN PATENT DOCUMENTS

DE 112015000123 T5 6/2016

OTHER PUBLICATIONS

Extended European Search Report received for European Patent Application No. 19192992.6, dated Dec. 18, 2019, 14 pages.

* cited by examiner

*Primary Examiner* — Adolf Dsouza
(74) *Attorney, Agent, or Firm* — Fiala & Weaver P.L.L.C.

(57) ABSTRACT

An Intelligent Transportation System (ITS) service station is provided that comprises a receiver configured to receive, from each of a set of ITS stations, a status message which includes the geographical position of the ITS station; a controller connected to the receiver and configured to determine, on the basis of the received geographical positions, whether a subset of ITS stations in the set meets a predetermined criterion of mutual proximity; and a transmitter connected to the controller and configured to transmit, when the subset comprises two or more ITS stations, a service message indicative of the subset to the ITS stations of the subset. Aspects may also include an ITS station receiving a service message.

17 Claims, 2 Drawing Sheets

SERVICE STATION FOR AN INTELLIGENT TRANSPORTATION SYSTEM

CROSS-REFERENCE TO RELATED APPLICATION(S)

Figure 1:
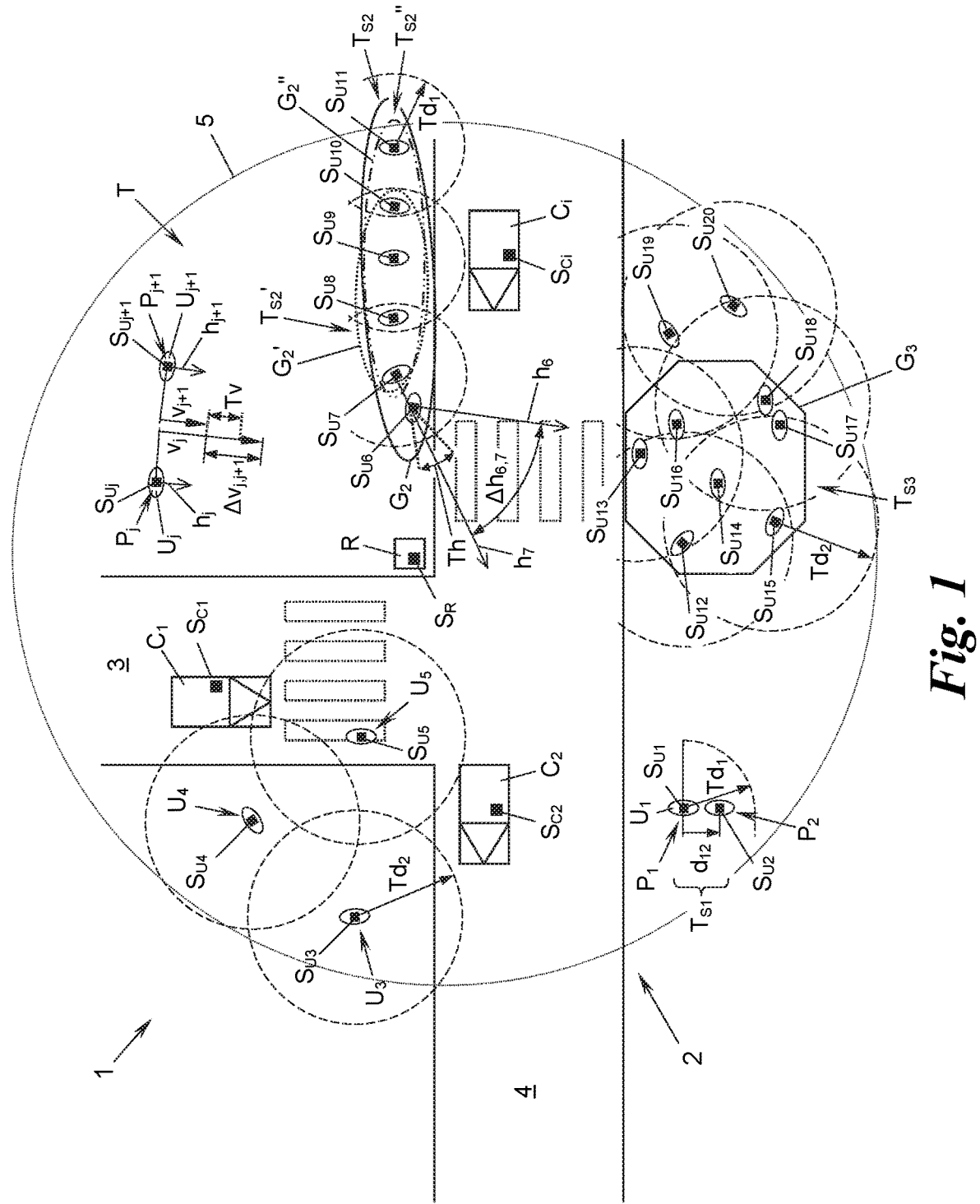

This application claims priority to European Patent Application No. 19 192 992.6, filed on Aug. 22, 2019, the entirety of which is incorporated herein by reference.

BACKGROUND

Technical Field

The disclosed subject matter relates to an Intelligent Transportation System (ITS) service station and to an ITS station for being carried by a Vulnerable Road User (VRU).

Background Art

For increasing road safety, a growing number of vehicles is equipped with an onboard ITS station which exchanges information via radio communication with other ITS stations in an ITS. The basic ITS communication architecture is described in ETSI (European Telecommunications Standards Institute) Standard ETSI EN 302 665 and related standards. According thereto, each ITS station repetitively transmits a status message comprising ITS station specific information, e.g., the geographical position of the ITS station, typically determined by ITS station sensors. Moreover, each ITS station receives status messages repetitively sent by other ITS stations comprising their respective specific information. ITS stations at the roadside (Road Side Unit, RSU) generate and transmit further information and/or relay other ITS stations' information inside the ITS, e.g., to a central server thereof.

Particularly for autonomous driving environments it is also envisaged, e.g., in the SAE International Standard SAE J2945/9 that each VRU, i.e., each road user that is particularly vulnerable to injury, such as a pedestrian, a cyclist, a powered two wheeler (PTW) or an animal, carries an ITS station which repetitively transmits a VRU-specific status message, e.g., a Personal Safety Message (PSM). Each status message comprises, inter alia, the VRU's geographic position, which shall be considered by other ITS stations in the ITS.

For sharing information, each ITS station transmits its status messages with respectively updated information typically in the range of one to ten times per second, depending on the message type, content and/or environment etc. For example, a PSM, according to SAE J2945/9, is transmitted two to five times per second, mainly depending on the motion speed of the VRU. With the increase in number of ITS stations and messages transmitted also the risk of a radio channel congestion and, consequently, of a delay in safety-relevant information exchange increases. Hence, the efficiency and even the effectiveness of the ITS may be compromised while the energy consumption of the ITS stations rises in such congested ITS environments, e.g., due to re-transmitting messages. At the same time, the energy consumption of an ITS station is often limited, particularly when the ITS station is battery-powered; for example, the battery of an ITS station carried by a VRU is very limited in size and weight. Simply reducing the channel load and the energy consumption, however, would be in conflict with safety requirements and, thus, the essence of the ITS.

BRIEF SUMMARY

It is an object of the disclosed subject matter to increase efficiency in an ITS while achieving desired safety requirements.

According to a first aspect, this object is achieved by an ITS service station which comprises:
a receiver configured to receive, from each of a set of ITS stations, a status message, which includes the geographical position of the ITS station;
a controller connected to the receiver and configured to determine, on the basis of the received geographical positions, whether a subset of ITS stations in said set meets a predetermined criterion of mutual proximity; and
a transmitter connected to the controller and configured to transmit, when said subset comprises two or more ITS stations, a service message indicative of the subset to the ITS stations of said subset.

The disclosed subject matter is based on the finding that a plurality of status messages transmitted by each of a group of ITS stations that are in mutual proximity often does not—or at best marginally—add information shared in the ITS when compared to messages transmitted by just one or a few of the ITS stations of this group. Hence, when such a subset of two or more ITS stations is determined, safety requirements are satisfied even if only one or a few ITS stations in the subset transmit their status messages, while the other ITS stations may save energy and radio channel capacity by suppressing the transmitting of their status messages.

The ITS service station provides the energy consuming service of determining one or more subsets of ITS stations to all ITS stations in the set, on the one hand, and, if any such subsets are determined, the option to suppress the transmitting of status messages to ITS stations in the subset, on the other hand. As the transmitting of status messages generally consumes a significant part of the energy stored in the ITS station's battery, the suppression thereof substantially contributes to the lifetime of the battery and, consequently, to the efficiency and the saving of weight of each ITS station.

The ITS service station, thus, increases both the energy and the radio channel efficiency of the ITS.

In a beneficial embodiment of the ITS service station, said determining comprises calculating, from the received geographical positions, distances between ITS stations in the set, and said criterion is that the respective distance of an ITS station to each of a predetermined number of other ITS stations in the set is smaller than a predetermined distance threshold. Thereby a very simple and efficient determination of the subset is achieved: The distance threshold determines the respective geographical distances between pairs of ITS stations in the subset (in other words: the mutual proximity of the ITS stations in the subset). The predetermined number specifies how many ITS stations have to be within the distance; this can easily and efficiently be calculated.

Advantageously, said criterion further comprises that a time during which said distance has been smaller than the predetermined distance threshold exceeds a predetermined duration. Hence, ITS stations that are close to each other for just a short moment (i.e., less than the predetermined duration), e.g., a cyclist riding past a pedestrian, are not in the same subset. Thereby, it is ensured that information which might be of some value in the ITS remains available.

In a further beneficial embodiment of the ITS service station, said determining further comprises calculating, from the received status messages, heading differences between headings of ITS stations in the set and speed differences between speeds of ITS stations in the set, and said criterion further comprises that the respective heading and speed differences of an ITS station to each of the predetermined number of other ITS stations in the set are smaller than predetermined heading and speed thresholds, respectively. Thereby, only those mutually proximate ITS stations form a subset that are both heading in a similar direction (i.e., having a mutual heading difference below the heading threshold) and moving at a similar speed (i.e., having a mutual speed difference below the speed threshold). On the other hand, ITS stations that are heading in substantially different directions and/or moving at substantially different speeds are not in the same subset even if they were in mutual proximity. In this case, it is also ensured that information on ITS stations of different heading or speed remains available in the ITS even if they are close to other ITS stations.

In one embodiment, the respective heading and/or the speed of the ITS stations may be included in the received status messages. Advantageously, however, the controller is configured to determine the heading and/or the speed of each ITS station from the geographical positions included in successive status messages received from the ITS station by the receiver. Both the status message and the ITS station transmitting the status message may thereby be particularly simple which helps increasing both energy and radio channel efficiency of the ITS.

Coming back to said predetermined number of other ITS stations, any number may be predetermined. In a favourable variant, said predetermined number is one. By requiring only one nearby ITS station, i.e., one other ITS station within the distance threshold, to form a subset, the probability of determining—at least small—subsets increases such that the potential of—at least small—savings in energy and radio channel capacity is high. In an alternative variant, said predetermined number is three. Hence, each ITS station requires at least three nearby ITS stations. While, in this case, the probability of determining a subset is lower than in the aforementioned variant, all ITS stations in a subset are, generally, in a closer geographical area (depending on said distance threshold), which helps achieving higher safety requirements.

It is advantageous when said service message comprises an identifier of at least one ITS station in the subset. The service message may be a multicast message comprising the identifiers of several ITS stations in the subset; alternatively, the service message is a unicast message comprising only the identifier of a single ITS station in the subset. However, each ITS station in the subset can be directly addressed. In this case, the ITS service station may designate one or a few of the ITS stations in the subset which shall continue transmitting status messages, such that the identifier(s) comprised in the service message merely identify the remaining ITS stations in the subset. Thereby, a further evaluation in the ITS stations can be avoided and the total energy required in the ITS is minimized.

Alternatively, said service message comprises a geographical area which includes the geographical positions of the ITS stations in the subset and excludes the geographical positions of other ITS stations of the set. In this variant, each ITS station which receives the service message has to determine, whether or not it is in said subset, i.e., whether it is indicated in the service message. Moreover, the ITS stations in the subset may designate one or a few ITS stations in the subset which shall continue transmitting status messages.

The service message may be any type of message, e.g., a specific, non-standard message, or a standard message, e.g., a Cooperative Awareness Messages (CAM) according to the ETSI Technical Specification TS 102 637 or Basic Safety Messages (BSM) according to the SAE International Standard J2735 BSM. In a favourable embodiment, the service message is a Collective Perception Message (CPM) according to the ETSI Technical Specification TS 103 324. Thereby, a strict compliance with ITS standards is achieved and the radio channel is not loaded with extra messages.

While the ITS service station may be of any type, including a movable ITS service station, it is particularly advantageous when the ITS service station is a roadside unit (RSU). Thereby, the ITS service station is stationary and provides its service to the (moving) ITS stations. It may be positioned at a crucial geographical point, e.g., a road intersection, such that a reliable service is permanently ensured there.

According to a second aspect, the disclosed subject matter provides an ITS station for being carried by a VRU, comprising:

a position sensor configured to determine a geographical position of the ITS station;

a transmitter connected to the position sensor and configured to transmit a status message, including the determined geographical position;

a receiver configured to receive, from an ITS service station, e.g., from an ITS service station of the abovementioned type, a service message indicating a subset of ITS stations; and a controller connected to the receiver and configured to control the transmitter and to determine, from the received service message, whether the ITS station is comprised in the subset, and if so, to suppress the transmitting of said status message.

This ITS station attains efficiency both in power consumption and radio channel usage in a very simple and effective way.

According to third aspect, the disclosed subject matter provides an ITS station for being carried by a VRU, comprising:

a position sensor configured to determine a geographical position of the ITS station;

a transmitter connected to the position sensor and configured to transmit a status message, including the determined geographical position;

a receiver configured to receive, from an ITS service station, e.g., from an ITS service station of the abovementioned type, a service message indicating a subset of ITS stations and, from other ITS stations, status messages; and a controller connected to the receiver and configured to control the transmitter and to determine, from the received service message and the received status messages, whether the ITS station is both comprised in the subset and not a designated ITS station, and if so, to suppress the transmitting of said status message.

This ITS station further ensures that at least one ITS station in the subset, i.e., the designated ITS station, continues transmitting status messages representative for all ITS stations in the subset, while the other ITS stations in the subset, which are not designated, may suppress the transmitting of status messages for reasons of radio channel and power saving in the ITS.

In an advantageous embodiment of the aforementioned ITS stations, wherein said service message comprises a geographical area, the controller is connected to the position sensor and configured to check the geographical position determined by the position sensor and the geographical area comprised by the received service message for a match in order to determine whether the ITS station is comprised in the subset. Thereby, the structure and content of the service message may be kept simple and yet unambiguous; moreover, each ITS stations can independently and easily determine therefrom, whether or not it is comprised in the subset.

While said status message may be a CAM according to ETSI EN 302 637-2, it is advantageous, when the status message is a PSM according to SAE J2945/9 or a related standard. This standard is particularly suitable for light weight, low energy VRUs.

BRIEF DESCRIPTION OF THE DRAWINGS/FIGURES

Figure 2:
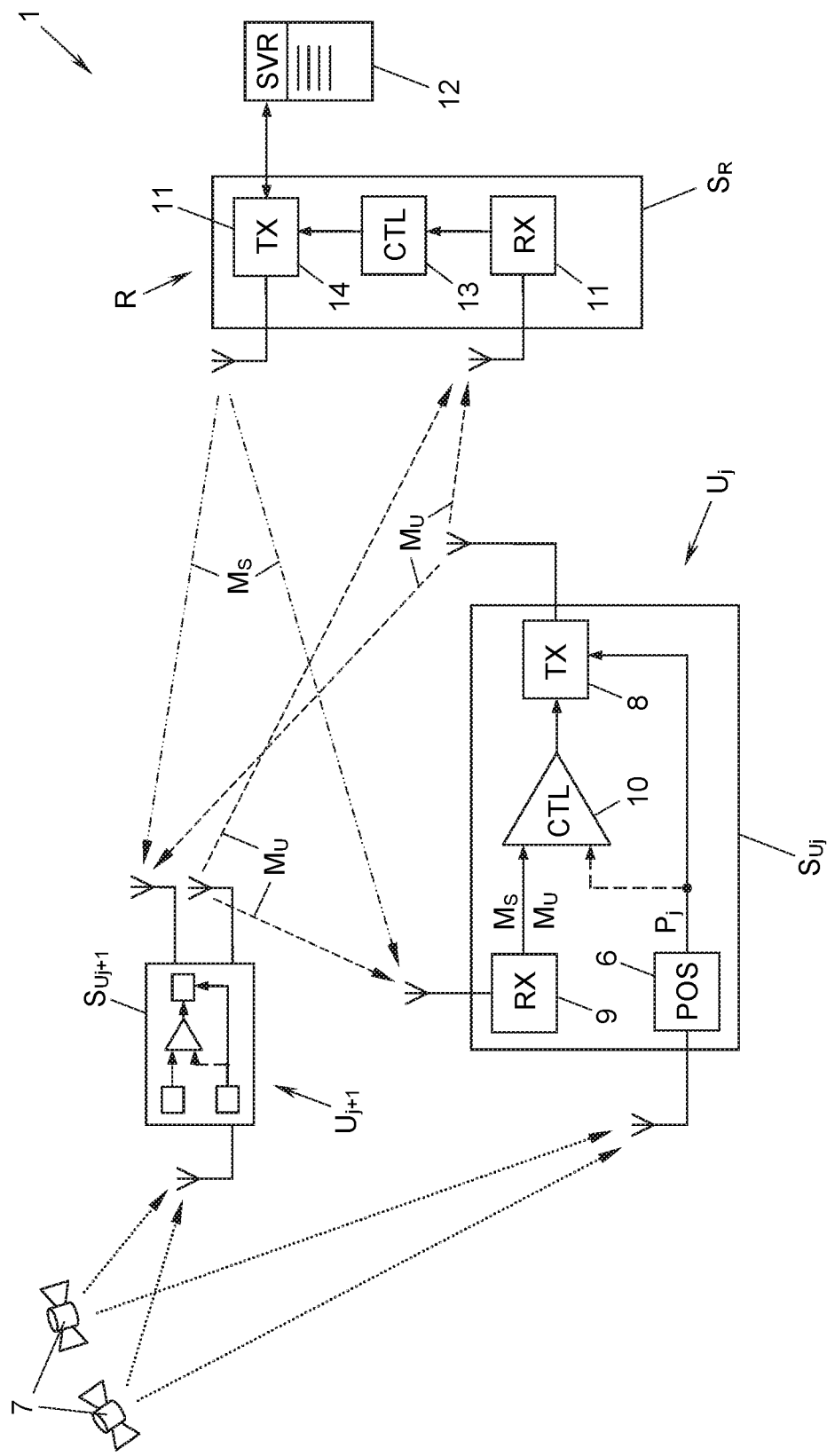

The disclosed subject matter will now be described in further detail by means of exemplary embodiments thereof under reference to the enclosed drawings, in which:

FIG. 1 shows a section of an Intelligent Transportation System (ITS) with an ITS service station and a multitude of ITS stations according to the disclosed subject matter on a road intersection in a plan view; and FIG. 2 shows the ITS according to FIG. 1 in a schematic block diagram.

DETAILED DESCRIPTION

FIG. 1 shows a section of an Intelligent Transportation System (ITS) 1 at an intersection 2 of two roads 3 and 4. On or alongside the roads 3 and 4 are vehicles $C_1$, $C_2$, ..., generally $C_i$, at least two (here: multiple) Vulnerable Road Users (VRUs) $U_1$, $U_2$, ..., generally $U_j$, and a stationary roadside unit (RSU) R. Each vehicle $C_i$ carries a respective ITS station $S_{C1}$, $S_{C2}$, ..., generally $S_{Ci}$, of the ITS 1. Similarly, each VRU $U_j$ carries a respective ITS station $S_{U1}$, $S_{U2}$, ..., generally $S_{Uj}$. The VRU ITS station $S_{Uj}$ is optionally integrated in a personal digital assistant, e.g., a smartphone. Moreover, the RSU R is an ITS service station $S_R$ of the ITS 1; in other embodiments, the ITS service station SR may be movable, e.g., onboard a vehicle $C_i$ or even carried by a VRU $U_j$. In the example of FIG. 1, all VRUs $U_j$ are pedestrians; in other cases, at least one of them could be a cyclist, a powered two wheeler (PTW), an animal or the like. A set T of VRU ITS stations $S_{Uj}$ is composed of at least some (here: all) of the VRU ITS stations $S_{Uj}$ that are within a radio communication range 5 of the ITS service station $S_R$.

On the basis of FIG. 2, details on the VRU ITS stations $S_{Uj}$ and the ITS service station SR and on their communication in the ITS 1 shall now be explained.

Each ITS station $S_{Uj}$ of a VRU $U_j$ includes a position sensor 6 which is configured to repetitively determine a geographical position $P_j$ of the ITS station $S_{Uj}$ and, thus, of the VRU $U_j$ carrying it. To this end, the position sensor 6 locates itself, e.g., by means of satellites 7 of a Global Navigation Satellite System (GNSS), e.g., GPS, Galileo, Glonass etc.; other ways of determining the geographical position $P_j$ are known in the art, e.g., by means of triangulation in a cellular network etc., and may be applied.

The VRU ITS station $S_{Uj}$ further comprises a transmitter 8, a receiver 9 and a controller 10. The transmitter 8 is connected to the position sensor 6 and is configured to repetitively transmit a status message $M_U$, e.g., a Personal Safety Message (PSM) according to the SAE International Standard SAE J2945/9 or a related standard, or a Cooperative Awareness Message (CAM) according to the ETSI (European Telecommunications Standards Institute) Standard ETSI EN 302 637-2 or a related standard. The status message MU includes the geographical position $P_j$ of the ITS station $S_{Uj}$ recently determined by the position sensor 6.

The status message $M_U$ is received by a receiver 11 of the ITS service station SR, i.e., in the RSU R, which is connected to a central server 12 of the ITS 1. Moreover, the status message MU is optionally also received by other ITS stations $S_{Ci}$, $S_{Uj+1}$ within the radio coverage range of the transmitter 8 of the ITS station $S_{Uj}$.

The ITS service station SR has a controller 13 which is connected to the receiver 11 and has access to the geographical positions $P_j$ included in the received status messages. On the basis of the received geographical positions $P_j$, the controller 13 of the ITS service station SR determines whether at least one subset $T_{S1}$, $T_{S2}$, ..., generally $T_{Sk}$, in said set T of ITS stations $S_{Uj}$ exists, in which subset $T_{Sk}$ (FIG. 1) the ITS stations $S_{Uj}$ meet a predetermined criterion of mutual proximity. Details and variants of this determination and the criterion will be exemplified with respect to FIG. 1 further below.

The ITS service station $S_R$ further comprises a transmitter 14 which is connected to the controller 13 and, when the controller 13 has determined at least one subset $T_{Sk}$ of two or more ITS stations $S_{Uj}$, transmits a service message $M_S$ which is indicative of the (at least one) determined subset $T_{Sk}$ to the ITS stations $S_{Uj}$ in the subset $T_{Sk}$. In case the controller 13 has determined more than one subset $T_{Sk}$, the transmitter 14 of the ITS service station SR may transmit a service message MS indicative of all subsets $T_{Sk}$ to the ITS stations $S_{Uj}$ of all subsets $T_{Sk}$, or separate service messages MS each being indicative of a separate one of the subsets $T_{Sk}$ to the ITS stations $S_{Uj}$ of the respective subset $T_{Sk}$. In any of these cases, the service message $M_S$ may either be a multicast message addressing multiple ITS stations $S_{Uj}$ of the one or more subsets $T_{Sk}$, or one or more unicast message(s) each addressing a single one of the ITS stations $S_{Uj}$ comprised in a subset $T_{Sk}$. To this end, the service message MS may be of any suitable format; in the present example, the service message MS is a Collective Perception Messages (CPM) according to the ETSI Technical Specification TS 103 324.

For being indicative of the subset $T_{Sk}$, the service message MS may, in one embodiment, comprise an identifier of at least one ITS station $S_{Uj}$ comprised in the subset $S_{Tk}$. The identifier is a unique code optionally included in the status message MU of the ITS station $S_{Uj}$, e.g., a temporary identifier according to SAE J2945/9, the geographical position $P_j$ of the respective ITS station $S_{Uj}$, or the like.

In another embodiment, the service message MS comprises a respective geographical area $G_1$, $G_2$, ..., generally $G_k$, for each determined subset $T_{Sk}$. The area $G_k$ includes the geographical positions $P_j$ of the ITS station $S_{Uj}$ in the respective subset $T_{Sk}$. To this end, the geographical area $G_k$ may be specified by a surrounding circle, ellipse, polygon (FIG. 1) or the like. However, the geographical area $G_k$ excludes geographical positions $P_j$ of ITS stations $S_{Uj}$ which are not in the respective subset $T_{Sk}$.

Returning to FIG. 1, it shall now be explained on the basis of different examples depicted therein how the controller 13 of the ITS service station SR determines the subset $T_{Sk}$.

Generally, said determining comprises calculating distances $d_{j,j+1}$ between different pairs of ITS stations $S_{Uj}$, $S_{Uj+1}$ in the set T. In the example of FIG. 1, the distance $d_{12}$ between the geographical positions $P_1$, $P_2$ of the ITS stations $S_{U1}$, $S_{U2}$ is low. It is understood that this distance $d_{12}$ is equal to a distance $d_{21}$—measured in the other direction—between the same ITS stations $S_{U1}$, $S_{U2}$. Hence, not all permutations of distances $d_{j,j+1}$ have to be calculated in the ITS service station SR. Moreover, some distances, e.g., the distance $d_{1,11}$ between the ITS stations $S_{U1}$, $S_{U11}$ in the example of FIG. 1, which is substantially larger, may be excluded from calculation beforehand on the basis of, e.g., segmentation of the ITS 1 into geographical or logical segments and their proximity.

In this example, the aforementioned criterion is that the respective distance of an ITS station $S_{Uj}$ to each of a predetermined number of other ITS stations $S_{Uj}$ in the set T is smaller than a predetermined distance threshold $Td_1$ (or $Td_2$). The distance threshold $Td_1$, $Td_2$ may range, e.g., from less than a meter to a few meters and optionally depends on said predetermined number and/or the specific environment of the ITS service station SR. In other words, a geographical density of ITS stations $S_{Uj}$ is evaluated.

Said predetermined number may be any number. In one embodiment, the predetermined number is "one" such that any two ITS stations $S_{Uj}$, $S_{Uj+1}$ the distance $d_{j,j+1}$ between which is below the distance threshold (here: a first distance threshold) $Td_1$ form a subset $T_{Sk}$. This criterion is met, e.g., by the ITS stations $S_{U1}$, $S_{U2}$ ($d_{12} < Td_1$) forming a first subset $T_{S1}$ in the example of FIG. 1.

The criterion is also met by the ITS stations $S_{U6}$ to $S_{U11}$ which are in a row, one behind the other, in the example of FIG. 1, as can be seen by the circles respectively drawn around the ITS stations $S_{U7}$, $S_{U9}$, $S_{U11}$ and having radii according to the distance threshold $Td_1$. Hence, the ITS stations $S_{U6}$ to $S_{U11}$ form another subset $T_{S2}$ indicated by an ellipsoid geographical area $G_2$. The ITS stations $S_{U7}$ to $S_{U10}$ of this subset $T_{S2}$ would, however, also meet the criterion if the predetermined number was two instead of one, thus forming a subset $T_{S2}'$ (indicated by a dotted line of the geographical area $G_2'$).

The ITS stations $S_{U12}$ to $S_{U20}$ in FIG. 1 depict a different embodiment in which the predetermined number is "three". In this case, also the distance threshold (referenced as a second distance threshold) $Td_2$ is optionally predetermined to be different from, particularly larger than, in the case described above. In this example, the respective distances $d_{j,j+1}$, $d_{j,j+2}$, $d_{j,j+3}$, of each of the ITS station $S_{U12}$ to $S_{U18}$ to each of three other ITS stations $S_{Uj+1}$, $S_{Uj+2}$, $S_{Uj+3}$ in the set T is smaller than the predetermined distance threshold $Td_2$ represented by the circles respectively drawn around the ITS stations $S_{Uj}$. Thereby, the ITS station $S_{U12}$ to $S_{U18}$ form a further subset $T_{S3}$ which is indicated by a polygonal geographical area $G_3$.

On the other hand, the ITS stations $S_{U19}$ and $S_{U20}$ are not in the subset $T_{S3}$, as each of them has only two nearby, i.e., closer than the distance threshold $Td_2$, ITS stations. In the case of the ITS stations $S_{U19}$ these are the ITS stations $S_{U16}$ and $S_{U20}$ and in case of the ITS station $S_{U20}$ the ITS stations $S_{U18}$ and $S_{U19}$.

The ITS stations $S_{U3}$, $S_{U4}$, $S_{U5}$ are even further apart from each other such that they do not form a subset $T_{Sk}$.

It shall be understood that other ways of determining a geographical density of ITS stations $S_{Uj}$ may be applied by the controller 13 of the ITS service station $S_R$.

The aforementioned criterion optionally comprises further aspects. For example, the ITS service station SR may, in one embodiment, additionally consider temporal changes in the mutual proximity of ITS stations $S_{Uj}$. In this case, the criterion comprises that a time during which said distance $d_{j,j+1}$ has been smaller than the predetermined distance threshold $Td_1$, $Td_2$ exceeds a predetermined duration, such that ITS stations $S_{Uj}$ which have been in mutual proximity for only a short moment, i.e., for a time shorter than the predetermined duration, are not in the same subset $T_{Sk}$. Said time may, e.g., be derived from status messages MU repetitively transmitted by each ITS station $S_{Uj}$ and received in the ITS service station SR. The predetermined duration is, e.g., between a few hundred milliseconds and a few seconds, particularly, about one second.

FIG. 1 depicts an alternative or additional optional embodiment in which also headings $h_1$, $h_2$, . . . , generally $h_j$, and/or speeds $v_1$, $v_2$, . . . , generally $v_j$, of ITS stations $S_{Uj}$ are considered. As shown for the ITS stations $S_{Uj}$ and $S_{Uj+1}$ in FIG. 1, each ITS stations $S_{Uj}$, $S_{Uj+1}$ has its respective heading $h_j$, $h_{j+1}$ and speed $v_j$, $v_{j+1}$. Therefrom, a respective speed difference $\Delta v_{j,j+1}$ between the speeds $v_j$, $v_{j+1}$ of ITS stations $S_{Uj}$, $S_{Uj+1}$ in the set T and a respective heading difference $\Delta h_{j,j+1}$ between headings $h_j$, $h_{j+1}$ of ITS stations $S_{Uj}$, $S_{Uj+1}$ in the set T (shown for the headings $h_6$, $h_7$ of the ITS stations $S_{U6}$ and $S_{U7}$ in FIG. 1, for visibility reasons) is calculated by the controller 13 of the ITS service station SR, when determining whether a subset $T_{Sk}$ of ITS stations $S_{Uj}$ in said set T meets the predetermined criterion of mutual proximity. In this embodiment, said criterion further comprises that the respective heading differences $\Delta h_{j,j+1}$ of the ITS station $S_{Uj}$ to each of the predetermined number of other ITS stations $S_{Uj+1}$ in the set T are smaller than a predetermined heading threshold Th, and that the respective speed differences $\Delta v_{j,j+1}$ of the ITS station $S_{Uj}$ to each of the predetermined number of other ITS stations $S_{Uj+1}$ in the set T are smaller than a predetermined speed threshold Tv.

In the example of FIG. 1, the heading difference $\Delta h_{6,7}$ of the headings $h_6$ and $h_7$ of the ITS station $S_{U6}$ to the ITS station $S_{U7}$ is not smaller than the predetermined heading threshold Th. This is why ITS station $S_{U6}$, in spite of being nearby the ITS station $S_{U7}$, is not in a subset $T_{S2}''$ (indicated by a broken line of a geographical area $G_2''$). Similarly, the speed difference $\Delta v_{j,j+1}$ of the ITS station $S_{Uj}$ to the ITS station $S_{Uj+1}$ is not smaller than the speed threshold Tv; hence, the ITS stations $S_{Uj}$ and $S_{Uj+1}$ in FIG. 1 cannot form a subset $T_{Sk}$ even if they were in close proximity.

The predetermined heading threshold Th is, e.g., between a few degrees and about 60 degrees, particularly about 30 degrees; the predetermined speed threshold Tv is, e.g., in the range of a few kilometers per hour. The speed threshold Tv optionally depends on the speed $v_j$ of the respective ITS station $S_{Uj}$, such that at lower speed $v_j$ the speed threshold Tv is predetermined to be lower; the same may apply to the heading threshold Th. Moreover, the heading and/or speed differences $\Delta h_{j,j+1}$, $\Delta v_{j,j+1}$ may optionally be calculated between an heading $h_j$ and/or speed $v_j$ of an ITS station $S_{Uj}$ and an average heading and/or an average speed, respectively, of the ITS stations $S_{Uj}$ of the subset $T_{Sk}$.

The heading $h_j$ and/or the speed $v_j$ of each ITS station $S_{Uj}$ may be included in the status message MU. Alternatively, the controller 13 may be configured to determine the heading $h_j$ and/or the speed $v_j$ of each ITS station $S_{Uj}$ from the geographical positions $P_j$ each of which is included in successive status messages MU which the ITS station $S_{Uj}$ repetitively transmits and which are received therefrom by the receiver 11 of the ITS service station $S_R$.

Returning to FIG. 2, the receiver 9 of the VRU ITS station $S_{Uj}$ is configured to receive the service message MS transmitted by the transmitter 14 of the ITS service station SR, which service message MS indicates the at least one subset $T_{Sk}$ of ITS stations $S_{Uj}$. The controller 10 of the ITS station $S_{Uj}$ is connected to the receiver 9 and controls the transmitter 8 of the ITS station $S_{Uj}$. From the received service message MS, the controller 10 of the ITS station $S_{Uj}$ determines whether it, i.e., the ITS station $S_{Uj}$, is comprised in the subset $T_{Sk}$. If this is the case, the controller 10 suppresses the transmitting of the status message MU by the transmitter 8, otherwise, the controller 10 lets the transmitter 8 transmit the status message MU. This suppressing of transmitting a status message MU may be once, i.e., suppressing a single status message MU; in another variant, the controller 10 suppresses the transmitting of a predetermined number of consecutive status messages MU or for a predetermined period of time.

In one embodiment, said determining whether the ITS station $S_{Uj}$ is comprised in the subset $T_{Sk}$ may be done on the basis of an identifier of the ITS station $S_{Uj}$ that was transmitted with an earlier status message MU to the ITS service station SR and comprised in the service message MS received therefrom.

In an alternative embodiment, the service message MS comprises the geographical area $G_k$ which includes the geographical positions $P_j$ of the ITS stations $S_{Uj}$ carried by the VRUs $U_j$, respectively. In this embodiment, the controller 10 is not only connected to the receiver 9 but also to the position sensor 6 (dashed line in FIG. 2). For determining whether the ITS station $S_{Uj}$ is comprised in the subset $T_{Sk}$, the controller is configured to check the geographical position $P_j$ determined by the positions sensor 6 and the geographical area $G_k$ comprised by the received service message MS for a match, i.e., the controller 10 checks whether the geographical position $P_j$ determined by the positions sensor 6 is located inside the geographical area $G_k$. If the check is positive, the ITS station $S_{Uj}$ is comprised in the subset $T_{Sk}$, otherwise it is not. In case of more than one subset $T_{Sk}$, it shall be understood that the controller 10 checks the geographical position $P_j$ determined by the positions sensor 6 and all geographical areas $G_k$ comprised by the received service message(s) MS for a match.

Optionally, the receiver 9 of the ITS station $S_{Uj}$ is configured to not only receive service messages MS from the ITS service station SR but also status messages MU from other ITS stations $S_{Uj}$. In this case, the controller 10 of the ITS station $S_{Uj}$ may determine whether the ITS station $S_{Uj}$ is both comprised in the subset $T_{Sk}$ indicated in the service message $M_S$ and is not a designated ITS station $S_{Uj}$ in the subset $T_{Sk}$, and only if both is true, to suppress the transmitting of the status message MU. Said designation is, e.g., based on the temporary identifier of each ITS station $S_{Uj}$ according to SAE J2945/9, wherein the ITS station $S_{Uj}$ with the lowest identifier in the subset $T_{Sk}$ is designated. Consequently, just the designated ITS station $S_{Uj}$ will continue transmitting status messages MU on behalf of all ITS stations $S_{Uj}$ in the subset $T_{Sk}$.

The designation of one or more ITS station $S_{Uj}$ in a subset $T_{Sk}$ may, in other variants, be performed by the ITS service stations SR and/or be based on another unique feature inherent to each ITS station $S_{Uj}$ in the subset $T_{Sk}$ and available to each other ITS station $S_{Uj}$ in the subset $T_{Sk}$, e.g., any unique code or the geographical positions $P_j$ relative to another ITS stations $S_{Uj}$ or to a centre of the geographical area $G_k$, etc.

CONCLUSION

The disclosed subject matter is not restricted to the specific embodiments described in detail herein, but encompasses all variants, modifications and combinations thereof that fall within the scope of the appended claims.

What is claimed is:

1. An Intelligent Transportation System (ITS) service station, comprising:

a receiver configured to receive, from each one of a set of ITS stations, a status message which includes the geographical position of said one ITS station;

a controller connected to the receiver and configured to determine, on the basis of the received geographical positions, whether a subset of ITS stations in said set meets a predetermined criterion of mutual proximity; and a transmitter connected to the controller and configured to transmit, when said subset comprises two or more ITS stations, a service message indicative of the subset to the ITS stations of said subset.

2. The ITS service station according to claim 1, wherein said determining comprises calculating, from the received geographical positions, distances between ITS stations in the set, and wherein said criterion comprises that the respective distance of an ITS station to each of a predetermined number of other ITS stations in the set is smaller than a predetermined distance threshold.

3. The ITS service station according to claim 2, wherein said criterion further comprises that a time during which said distance has been smaller than the predetermined distance threshold exceeds a predetermined duration.

4. The ITS service station according to claim 2, wherein said determining further comprises calculating, from the received status messages, heading differences between headings of ITS stations in the set and speed differences between speeds of ITS stations in the set, and wherein said criterion further comprises that the respective heading and speed differences of the ITS station to each of the predetermined number of other ITS stations in the set are smaller than predetermined heading and speed thresholds, respectively.

5. The ITS service station according to claim 4, wherein the controller is configured to determine at least one of the heading and the speed of each ITS station from the geographical positions included in successive status messages received from the ITS station by the receiver.

6. The ITS service station according to claim 2, wherein said predetermined number is one.

7. The ITS service station according to claim 2, wherein said predetermined number is three.

8. The ITS service station according to claim 1, wherein said service message comprises an identifier of at least one ITS station in the subset.

9. The ITS service station according to claim 1, wherein said service message comprises a geographical area which includes the geographical positions of the ITS stations in the subset and excludes the geographical positions of other ITS stations of the set.

10. The ITS service station according to claim 1, wherein the service message is a Collective Perception Message (CPM).

11. The ITS service station according to claim 1, wherein the ITS service station is a roadside unit (RSU).

12. An Intelligent Transportation System (ITS) station for being carried by a Vulnerable Road User (VRU), comprising:

a position sensor configured to determine a geographical position of the ITS station;

a transmitter connected to the position sensor and configured to transmit a status message including the determined geographical position;

a receiver configured to receive, from an ITS service station, a service message indicating a subset of ITS stations; and a controller connected to the receiver and configured to control the transmitter and to determine, from the received service message, whether the ITS station itself is comprised in the subset of ITS stations indicated in the service message received by the receiver, and if so, to suppress the transmitting of said status message.

13. The ITS station according to claim 12, wherein said service message comprises a geographical area, wherein the controller is connected to the position sensor and configured to check the geographical position determined by the position sensor and the geographical area comprised by the received service message for a match in order to determine whether the ITS station is comprised in the subset.

14. The ITS station according to claim 12, wherein said status message is a Personal Safety Message (PSM).

15. An Intelligent Transportation System (ITS) station for being carried by a Vulnerable Road User (VRU), comprising:
- a position sensor configured to determine a geographical position of the ITS station;
- a transmitter connected to the position sensor and configured to transmit a status message including the determined geographical position;
- a receiver configured to receive, from an ITS service station, a service message indicating a subset of ITS stations and, from other ITS stations, status messages; and
- a controller connected to the receiver and configured to control the transmitter and to determine, from the received service message and the received status messages, whether the ITS station itself is both comprised in the subset of ITS stations indicated in the service message received by the receiver and not a designated ITS station, and if so, to suppress the transmitting of said status message.

16. The ITS station according to claim 15, wherein said service message comprises a geographical area, wherein the controller is connected to the position sensor and configured to check the geographical position determined by the position sensor and the geographical area comprised by the received service message for a match in order to determine whether the ITS station is comprised in the subset.

17. The ITS station according to claim 15, wherein said status message is a Personal Safety Message (PSM).

* * * * *